United States Patent
Kubota et al.

(10) Patent No.: US 7,697,098 B2
(45) Date of Patent: Apr. 13, 2010

(54) MANUFACTURING METHOD OF LIQUID CRYSTAL DISPLAY DEVICE

(75) Inventors: Daisuke Kubota, Kanagawa (JP); Takeshi Nishi, Kanagawa (JP); Tetsuji Ishitani, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 641 days.

(21) Appl. No.: 11/520,773

(22) Filed: Sep. 14, 2006

(65) Prior Publication Data

US 2007/0064176 A1    Mar. 22, 2007

(30) Foreign Application Priority Data

Sep. 15, 2005    (JP)    ............................. 2005-268450

(51) Int. Cl.
*G02F 1/1337*    (2006.01)
*C09K 9/00*    (2006.01)

(52) U.S. Cl. ........................... 349/130; 349/86; 349/87; 349/88; 349/89; 349/90; 349/91; 349/92; 349/93; 252/299.01; 252/299.5; 252/299.61; 252/299.63; 252/299.66; 252/299.67; 428/1.1; 428/1.3

(58) Field of Classification Search ............. 349/86–93, 349/130, 182; 252/299.01, 299.5, 299.61, 252/299.63, 299.66, 299.67; 428/1.1, 1.3
See application file for complete search history.

(56) References Cited

U.S. PATENT DOCUMENTS

| | | | |
|---|---|---|---|
| 4,892,392 A * | 1/1990 | Broer | ......................... 349/124 |
| 5,473,450 A | 12/1995 | Yamada et al. | |
| 5,589,235 A | 12/1996 | Ogawa | |
| 5,589,959 A * | 12/1996 | Hikmet | ......................... 349/88 |
| 5,612,387 A | 3/1997 | Ogawa | |
| 5,620,630 A | 4/1997 | Onishi et al. | |
| 5,635,106 A | 6/1997 | Basturk et al. | |

(Continued)

FOREIGN PATENT DOCUMENTS

EP    1 170 626    1/2002

(Continued)

OTHER PUBLICATIONS

International Search Report (Application No. PCT/JP2006/317926) dated Nov. 28, 2006.

(Continued)

*Primary Examiner*—Frank G Font
*Assistant Examiner*—Mary A El Shammaa
(74) *Attorney, Agent, or Firm*—Eric J. Robinson; Robinson Intellectual Property Law Office, P.C.

(57) ABSTRACT

It is an object of the present invention to suppress light leakage in a dark state which is generated by rubbing treatment. A liquid crystal material containing an ultraviolet curable liquid crystalline monomer at a concentration of more than 0 wt % and not more than 1.0 wt % is used for a liquid crystal layer, and the liquid crystal layer is irradiated with ultraviolet rays. By applying such a liquid crystal layer to a liquid crystal display device, light leakage in a dark state can be suppressed, and the black display can be improved. Therefore, a liquid crystal display device with an excellent contrast and high display quality can be obtained.

16 Claims, 6 Drawing Sheets

U.S. PATENT DOCUMENTS

| | | | |
|---|---|---|---|
| 5,729,319 A | | 3/1998 | Inou et al. |
| 5,730,900 A | * | 3/1998 | Kawata ................. 252/299.01 |
| 5,936,692 A | * | 8/1999 | Van De Witte ............. 349/128 |
| 5,942,292 A | | 8/1999 | Yoneda et al. |
| 5,959,707 A | | 9/1999 | Murai et al. |
| 6,184,968 B1 | | 2/2001 | Taylor-Smith |
| 6,221,443 B1 | | 4/2001 | Kubota et al. |
| 6,452,650 B1 | | 9/2002 | Nakao et al. |
| 6,483,559 B1 | | 11/2002 | Hiraki et al. |
| 6,583,838 B1 | | 6/2003 | Hoke et al. |
| 6,660,344 B2 | * | 12/2003 | Lub .......................... 428/1.1 |
| 6,797,096 B2 | | 9/2004 | Nam |
| 6,821,457 B1 | | 11/2004 | Natarajan et al. |
| 6,894,742 B2 | | 5/2005 | Inoue et al. |
| 6,899,823 B2 | | 5/2005 | Sato et al. |
| 6,903,796 B2 | | 6/2005 | Kataoka |
| 6,977,704 B2 | | 12/2005 | Kataoka |
| 2002/0021401 A1 | | 2/2002 | Kataoka |
| 2003/0111640 A1 | * | 6/2003 | Lub ...................... 252/299.61 |
| 2006/0158589 A1 | | 7/2006 | Nishi et al. |
| 2007/0116901 A1 | * | 5/2007 | Kubota et al. ................ 428/1.3 |
| 2007/0290168 A1 | * | 12/2007 | Fukagawa et al. ...... 252/299.01 |

FOREIGN PATENT DOCUMENTS

| | | |
|---|---|---|
| JP | 2002-023199 | 1/2002 |
| JP | 2005-024927 | 1/2005 |
| JP | 2005-128160 | 5/2005 |

OTHER PUBLICATIONS

Written Opinion (Application No. PCT/JP2006/317926) dated Nov. 28, 2006.

Ohmuro et al., *33.3: Development of Super-High-Image-Quality Vertical-Alignment-Mode LCD*, SID 97 Digest, SID International Symposium Digest of Technical Papers, 1997, pp. 845-848.

* cited by examiner

MANUFACTURING METHOD OF LIQUID CRYSTAL DISPLAY DEVICE

TECHNICAL FIELD

The present invention relates to a manufacturing method of a liquid crystal display device.

BACKGROUND ART

A liquid crystal display device is widely used as a light and thin display device. A liquid crystal display device performs image display by using a nature of liquid crystal that a refractive index of liquid crystal changes as an arrangement state of liquid crystal molecules is changed by application of an electric field.

A liquid crystal material originally has birefringence, and a refractive index of a minor axis direction of a molecule and a refractive index of a major axis direction are represented as $n_o$ and $n_e$, respectively. When linearly-polarized light enters liquid crystal, a phase difference from the original polarization state, which corresponds to a difference between no and $n_e$, is generated, and elliptically-polarized light is obtained. When a polarizing plate is placed where light passing through liquid crystal goes, only light which corresponds to a transmission axis of the polarizing plate passes through, and becomes linearly-polarized light of which the angle is different from that of the incident light. Since a refractive index of liquid crystal changes when an electric field is applied to liquid crystal and the arrangement is changed, different polarization state can be obtained. By appropriately selecting arrangement of liquid crystal and the angle of a polarizing plate, change of light and dark can be made. For display using an electro-optic effect of liquid crystal, substrate surfaces need orientation treatment, and there are several operation modes possible, depending on the initial orientation.

A TN (twisted nematic) mode is widely used as s a typical mode. In the TN mode, a major axis of a liquid crystal molecule is parallel to a substrate under a condition where no electric field is applied, and molecules are arranged between substrates, and twisted with respect to each other. By applying an electric field, the arrangement state of liquid crystal molecules is changed from a state where a major axis of a molecule is parallel to a substrate plane to a state where the major axis of the molecule is vertical to the substrate plane. However, in a case where the initial orientation of the liquid crystal molecules is parallel to the substrate, molecules located close to the substrate surface are not easily operated even when an electric field is applied since there is strong orientation force due to an interaction between the molecules and the substrate, so that these molecules stay almost in the initial condition. Therefore, birefringence of the liquid crystal remains in that portion, and slight light leakage is generated because of phase difference due to this birefringence, hence it is difficult to obtain an ideal dark state.

As for a contrast which is a ratio of luminance of a light state to luminance of a dark state, as the ratio becomes higher, the image quality can be improved. A contrast is one of the elements which determine display performance.

Thus, as a method for improving a contrast ratio, a liquid crystal display device using a vertical alignment mode instead of the conventional TN mode is proposed (for example, refer to a non-patent document 1).

In a vertical alignment mode, liquid crystal molecules are oriented vertical to a substrate surface of a liquid crystal display device beforehand, therefore, birefringence which occurs in a TN mode does not occur, and transmitted light is blocked by a polarizing plate. In this way, there is little light leakage, and a dark state can be obtained easily. At a time of driving, liquid crystal molecules are inclined from the vertical direction by an electric field, so that a light transmitting property due to birefringence of a liquid crystal material can be obtained.

When an electric field is applied to liquid crystal of vertical alignment, the inclined angle of a molecule to the substrate is determined by the electric field intensity, a liquid crystal material, and characteristics of the orientation mode, and the azimuth of the molecule can be an arbitrary value unless special treatment is conducted.

This arbitrariness of the azimuth of the molecule indicates a possibility of local disorder of orientation order. When an actual display device using liquid crystal of vertical alignment is observed, a display defect caused by this disorder is often found. This display defect is referred to as a schlieren structure, and transmission factor of a pixel is decreased when a schlieren structure appears. Furthermore, the schlieren structure moves with switching of images, which makes a residual image, leading to decrease in display quality of the display.

This defect is prevented by performing a rubbing method which is treatment capable of defining the azimuth of a molecule beforehand.

[non-patent document 1] K. Ohmuro, S. Kataoka, T. Sasaki, and Y. Koike, Society For Information Display '97 Digest of Technical Papers, (1997) 845)

DISCLOSURE OF INVENTION

Although the rubbing method is effective, a pre-tilt is generated and light leakage occurs under a dark display state. It is an object of the present invention to improve the decrease in display quality due to such light leakage.

One feature of a manufacturing method of a liquid crystal display device of the present invention is to include the steps of: forming an electrode over one surface of each of a pair of substrates; forming orientation films over the electrodes respectively; and sandwiching a liquid crystal layer between the pair of substrates so that the orientation films face each other, wherein the liquid crystal layer includes a liquid crystal material containing an ultraviolet curable liquid crystalline monomer; and wherein the liquid crystal layer is irradiated with ultraviolet rays so that the ultraviolet curable liquid crystalline monomer reacts.

Another feature of a manufacturing method of a liquid crystal display device of the present invention is to include the steps of: forming an electrode over one surface of each of a pair of substrates; forming orientation films over the electrodes respectively; and sandwiching a liquid crystal layer between the pair of substrates so that the orientation films face each other, wherein the liquid crystal layer includes a liquid crystal material containing an ultraviolet curable liquid crystalline monomer at a concentration of more than 0 wt % and not more than 1.0 wt %; and wherein the liquid crystal layer is irradiated with ultraviolet rays so that the ultraviolet curable liquid crystalline monomer reacts.

Another feature of a manufacturing method of a liquid crystal display device of the present invention is to include the steps of: forming an electrode over one surface of each of a pair of substrates; forming orientation films over the electrodes, respectively; and sandwiching a liquid crystal layer between the pair of substrates so that the orientation films face each other, wherein the liquid crystal layer includes a liquid crystal material containing an ultraviolet curable liquid crystalline monomer at a concentration of 0.1 to 1.0 wt %; and wherein the liquid crystal layer is irradiated with ultraviolet rays so that the ultraviolet curable liquid crystalline monomer reacts.

Another feature of a manufacturing method of a liquid crystal display device of the present invention is that orientation treatment is performed on at least one of the orientation films in the above-described structures. As the orientation treatment, a rubbing method may be used.

Another feature of a manufacturing method of a liquid crystal display device of the present invention is that a pair of polarizing plates of which polarizing axes cross at right angles to each other are placed over the pair of substrates.

The ultraviolet curable liquid crystalline monomer corresponds to an acryloyloxy group attached with a liquid crystal skeleton.

As the liquid crystal skeleton, one of a biphenyl-based skeleton, a tolan-based skeleton, an ester-based skeleton, an alkenyl-based skeleton, a cyclohexene-based skeleton, an azine-based skeleton, a fluorine-containing condensed ring-based skeleton, and a naphthalene-based skeleton can be used.

The liquid crystal layer preferably shows vertical alignment. It is to be noted that the liquid crystal material indicates all the liquid crystal materials forming the liquid crystal layer, and the ultraviolet curable liquid crystalline monomer is contained with the above-described range in all the liquid crystal materials.

By irradiating a liquid crystal layer containing an ultraviolet curable liquid crystalline monomer with ultraviolet rays, light leakage under a dark state caused by a pre-tilt can be suppressed, and the black display can be improved. In this way, a liquid crystal display device with an excellent contrast and high display quality can be obtained.

BEST MODE FOR CARRYING OUT THE INVENTION

Embodiment modes of the present invention will be described hereinafter with reference to the drawings. However, the invention is not limited to the following description, and it is to be easily understood by those skilled in the art that the modes and details can be changed in various ways without departing from the spirit and scope of the invention. Therefore, the invention is not interpreted as being limited to the following description of the embodiment modes.

Embodiment Mode 1

Figure 1:
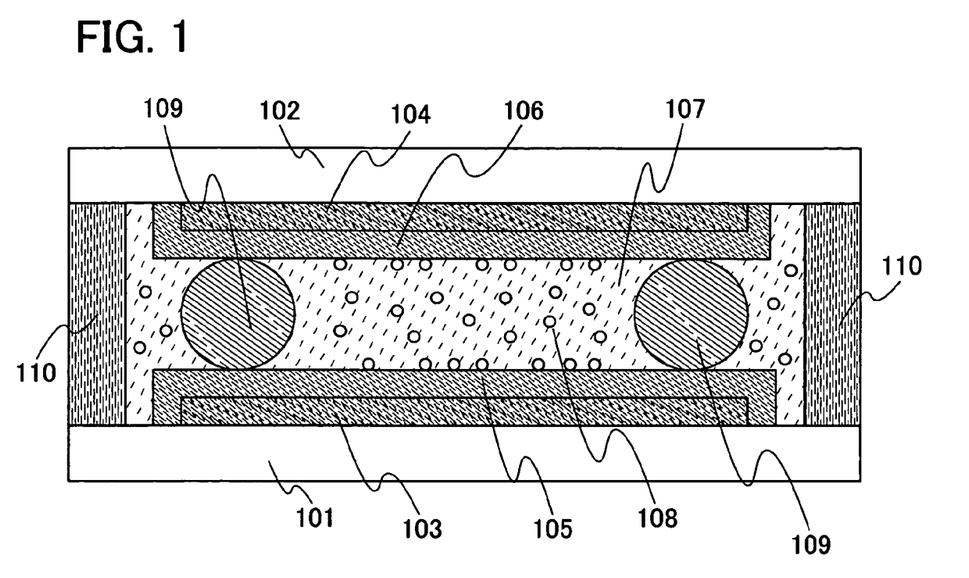
FIG. 1 is a view describing a cross section of a liquid crystal cell used for a liquid crystal display device.

An embodiment mode of a liquid crystal display device of the present invention will be described with reference to drawings. In FIG. 1, a cross section of a liquid crystal cell used for a liquid crystal display device that is an embodiment mode of the present invention is shown. A liquid crystal cell herein indicates a condition where liquid crystal is sandwiched between a pair of substrates and sealing is completed. A liquid crystal display device can be manufactured by attaching a wiring for driving, placing an optical element such as a polarizing plate, connecting a driver circuit, and placing a light source to such a liquid crystal cell.

In FIG. 1, each of reference numerals 101 and 102 denotes a substrate; 103 and 104, an electrode; 105 and 106, an orientation film; 107, a liquid crystal layer; 108, a liquid crystalline monomer; 109, a spacer; and 110, a sealant.

The first substrate 101 and the second substrate 102 are made of a material having a visible light transmitting property, and glass, plastic, quartz or the like can be used, for example. In a case where optical modulation of a liquid crystal material is controlled by an electric signal, an electrode and the like described later are formed and processed with desired specifications; therefore, a substrate material which satisfies heat resistance and chemical resistance in each step needs to be selected. As for a thickness of the substrate, it is acceptable when the substrate is thick enough not to have a damage in a processing step or a damage by a physical shock after the display device is completed. For example, a material with a thickness of 2 mm or less is preferable, in a case of a glass substrate. In a case of a plastic substrate, the substrate can be thinned more than that in a case of glass. In a case where the liquid crystal display device is used as a transmissive type, both the first substrate 101 and the second substrate 102 need to have a light transmitting property, and in a case of a reflective type, at least either the first substrate 101 or the second substrate 102 has a light transmitting property.

Furthermore, a substrate which has no anisotropy in a refractive index is preferably used. This is for preventing deterioration in display characteristics such as display with different tone depending on the view angle, caused when an element giving polarization to other than a liquid crystal layer is contained in the substrate.

As the first electrode 103 and the second electrode 104, a conductive material excellent in a visible light transmitting property, such as indium tin oxide (abbreviation: ITO) is used. However, as long as at least one of the first electrode 103 and the second electrode 104 has a visible light transmitting property, the other does not necessarily have a visible light transmitting property.

Furthermore, a portion which does not contribute to display, or a wiring for supplying an electric signal is not necessarily an electrode having a light transmitting property.

Furthermore, although an element with a structure in which only one pixel electrode exists in a region filled with liquid crystal is shown in FIG. 1, the invention does not necessarily have this structure, and there is no problem even if a plurality of pixels are formed over a substrate of a region filled with liquid crystal.

As the orientation films 105 and 106, an organic matter such as polyimide or an inorganic matter such as silicon oxide ($SiO_x$, X=1 to 2) can be used. A material which is marketed for vertical alignment can be used as the orientation film. A thickness of the orientation film is preferably 100 nm or less, more preferably 40 to 100 nm.

A nematic material can be used as liquid crystal for the liquid crystal layer 107. The dielectric anisotropy of this liquid crystal is preferably negative, but not particularly limited thereto.

Furthermore, the liquid crystal layer 107 contains the liquid crystalline monomer 108. The liquid crystalline monomer 108 is a material which can be oriented by a usual liquid crystal orientation method, even in a monomeric state. As the liquid crystalline monomer 108, an ultraviolet curable liquid crystalline monomer which reacts by being irradiated with ultraviolet rays is used. It is to be noted that a liquid crystalline monomer is a material in which the molecular arrangement of the liquid crystal skeleton is immobilized while the orientation condition stays the same, when reaction occurs under the oriented condition. As the liquid crystalline monomer, an acryloyloxy group attached with a liquid crystal skeleton can be used. To the liquid crystal skeleton, one of biphenyl-based liquid crystal, tolan-based liquid crystal, an ester-based skeleton, an alkenyl-based skeleton, a cyclohexene-based skeleton, an azine-based skeleton, a fluorine-containing condensed ring-based skeleton, and a naphthalene-based skeleton is attached. These are examples, and other monomers showing liquid crystallinity can also be used, not limited to these.

A light leakage suppressing effect in a dark state is obtained when a contained amount of a liquid crystalline monomer is more than 0 wt % in all the liquid crystal materials forming a liquid crystal layer and when the liquid crystal layer is irradiated with ultraviolet rays. On the other hand, considering a voltage holding rate which affects display flickering, tone change or the like, a contained amount of a liquid crystalline monomer is preferably not more than 1.0 wt %. Therefore, the liquid crystalline monomer is preferably contained at a concentration of more than 0 wt % and not more than 1.0 wt % in the liquid crystal material. More preferably, the liquid crystalline monomer is contained at a concentration of 0.1 to 1.0 wt % in the liquid crystal material.

The spacer 109 is a substance which keeps a space between the first substrate 101 and the second substrate 102 uniform, and a substance which can maintain a desired space between the substrates can be used as the spacer 109. As for its shape, a composition of a spherical shape or a pillar shape, a composition with a trapezoid-shaped cross section, and the like can be given.

The sealant 110 is formed so as to surround the liquid crystal material, since its purpose is bonding the substrates together and preventing the liquid crystal layer from flowing outside the sealant. The sealant may be an adhesive, and materials of a thermosetting type or a photo-curing type can be used. In addition, an epoxy resin, an acrylic resin, or the like can also be used.

Next, a manufacturing method of the liquid crystal cell in the liquid crystal display device described in this embodiment mode will be explained. The orientation films 105 and 106 for vertical alignment are respectively formed over the first electrode 103 and the second electrode 104 which respectively are formed over the first substrate 101 and the second substrate 102. In a case of vertical alignment, there is a possibility that orientation defects occur due to arbitrariness of the azimuth of molecules, as described above. Therefore, orientation treatment is performed on surfaces of the orientation films 105 and 106 according to need, so as to define the azimuth. As the orientation treatment method, a rubbing method can be used.

In a case of using the rubbing method, a direction of the rubbing treatment on the orientation film 105 and a direction of the rubbing treatment on the orientation film 106 may be the same direction, the opposite directions, or the two directions may be set so that the direction of the upper orientation film and the direction of the lower orientation film cross at right angles. Alternatively, the rubbing treatment may be performed only one of the orientation films. Further alternatively, inside of a pixel may be divided into a plurality of regions so that the rubbing treatment with a different direction is performed to each region.

In a case of an active matrix drive, a device is generally driven using an AC waveform so as to prevent burn-in of liquid crystal, and may be driven so that phases of signals are inverted between pixels. In a case of an active matrix drive, there are a source line inversion drive and a gate line inversion drive. Since the orientation of liquid crystal is affected by a direction of an electric field between pixels, an orientation direction according to the method of inversion drive may be selected. For example, in a case of the source line inversion drive, the rubbing direction is set to be parallel to a source line.

Next, the spacer 109 which keeps the space between the substrates is placed over the substrate over which the orientation film is formed. In a case of using spherical beads spacers, the spacers are sprayed over the first substrate 101 or the second substrate 102, using an inert gas as a carrier gas. The spray of the spacers is conducted with respect to one of the substrates. It is to be noted that a composition for space holding may be formed over the substrate beforehand, and in that case, there is no need to spray the beads spacers particularly.

Next, the sealant 110 is applied over the first substrate 101 or the second substrate 102. Application of the sealant may be performed by a dispenser method or a screen printing method. The two substrates are attached to each other so that their surfaces with the orientation films face each other, and then the sealant 110 is hardened.

Next, the liquid crystal layer 107 is interposed between the first substrate 101 and the second substrate 102. A liquid crystal material used for the liquid crystal layer 107 contains the above-described liquid crystalline monomer beforehand. The liquid crystal layer 107 is interposed between the first substrate 101 and the second substrate 102 by injecting the liquid crystal material containing the liquid crystalline monomer 108, using a vacuum injection method, for example.

Alternatively, a method in which a liquid crystal material containing the liquid crystalline monomer 108 is dropped after the sealant 110 is formed over the first substrate 101, and then the second substrate 102 is attached, may be used. It is to be noted that the method in which the liquid crystal material is dropped is more preferable than the method of injecting the liquid crystal material in a case of using a large substrate.

After the liquid crystal material is injected, a portion outside the sealing of the attached substrates is cut by a glass scriber and the electrode for inputting a driving signal is extracted. After the electrodes are extracted, sealing is performed with a resin. Furthermore, in order to get rid of orientation nonuniformity of the liquid crystal which is generated when the liquid crystal is injected, the liquid crystal material is changed to have an isotropic phase in a heating apparatus in which the temperature is set to be higher than a phase transition temperature of liquid crystal by 5 to 10° C., and held for 30 seconds, then the temperature is lowered to the room temperature.

Next, the liquid crystal layer 107 is irradiated with ultraviolet rays, so that the liquid crystalline monomer 108 contained in the liquid crystal material reacts. For the ultraviolet irradiation, an ultraviolet irradiation device is used. For example, ultraviolet of which a center wavelength is 365 nm can be used. It is to be noted that the irradiation conditions such as wavelength, intensity, and irradiation time are selected appropriately so as not to deteriorate the liquid crystal material. Furthermore, a pair of polarizing plates of which polarizing axes cross at right angles are provided over the first substrate 101 and the second substrate 102, respectively.

The reacted liquid crystalline monomer 108 is in a condition of being scattered or disposed in a network-like way in the liquid crystal material. It is considered that, when the liquid crystalline monomer is hardened by being irradiated with ultraviolet rays, the pre-tilt which is formed between the substrate surface and a liquid crystal molecule by the rubbing treatment is changed, and the molecule is oriented vertical to the substrate.

As described above, by irradiating a liquid crystal layer containing an ultraviolet curable liquid crystalline monomer with ultraviolet rays, light leakage due to a pre-tilt in a dark state can be suppressed, and the black display can be improved. Therefore, a liquid crystal display device with an excellent contrast and high display quality can be obtained.

In this embodiment mode, the explanation is made on a vertical alignment mode, but an operation mode is not limited thereto, and the invention is effective in cases where light leakage occurs due to a pre-tilt.

Embodiment Mode 2

Figure 2:
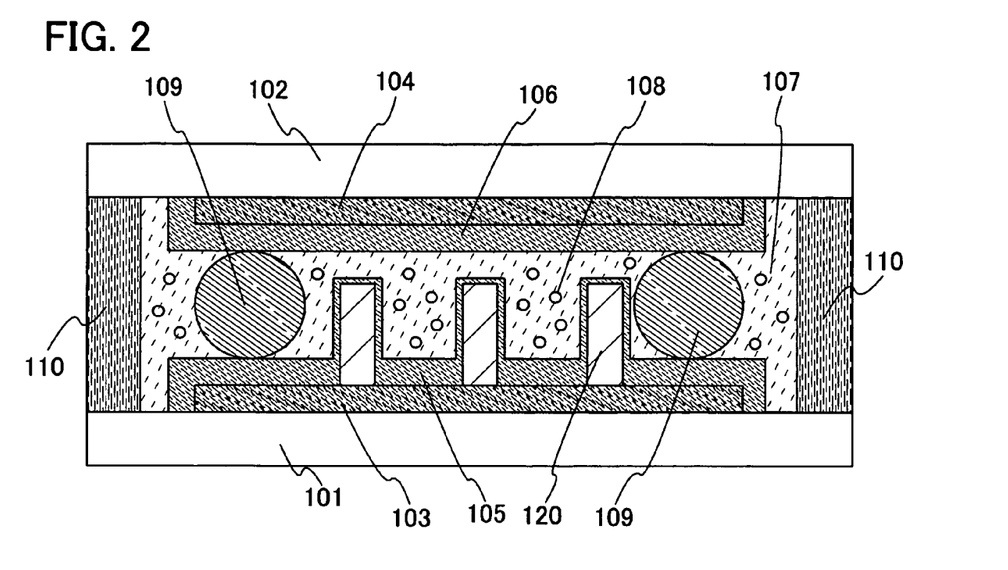
FIG. 2 is a view describing a cross section of a liquid crystal cell used for a liquid crystal display device.

A cross section of a liquid crystal cell used for a liquid crystal display device that is an embodiment mode of the present invention is shown in FIG. 2. The structure other than a projection 120 is the same as Embodiment Mode 1, so the same portions are indicated by the same reference numerals and the description thereof is omitted here. Also in this embodiment mode, a pair of polarizing plates of which polarizing axes cross at right angles are provided over a first substrate 101 and a second substrate 102, respectively.

The projection 120 is formed over a first electrode 103. A shape of the projection 120 is not particularly limited, and it may be a cylindrical shape, a pillar shape, or a conical shape. The projection may reach a second electrode 104 or not. As a material forming the projection 120, an inorganic matter or an organic matter can be used. As the inorganic matter, silicon oxide ($SiO_2$), silicon nitride (SiN), silicon oxynitride (SiON) or the like, and as an organic matter, an acrylic resin, an epoxy resin, a resist, divinylbenzene or the like can be used. It is to be noted that the projection 120 needs to have an insulation property. In addition, the projection 120 may be formed over the second electrode 104.

The above-described projection 120 can prevent a liquid crystalline monomer 108 contained in a liquid crystal material from being distributed nonuniformly.

In the same way as Embodiment Mode 1, a liquid crystal layer 107 containing the liquid crystalline monomer 108 is interposed between the first substrate 101 and the second substrate 102. From the view point of suppressing light leakage in a dark state and a voltage holding rate, the liquid crystalline monomer 108 is contained at a concentration of more than 0 wt % and not more than 1.0 wt % in all the liquid crystal materials used for the liquid crystal layer. More preferably, the liquid crystalline monomer is contained at a concentration of 0.1 to 1.0 wt % in the liquid crystal material.

After that, the liquid crystal layer 107 is irradiated with ultraviolet rays, so that the liquid crystalline monomer 108 contained in the liquid crystal material reacts.

A display device having such a liquid crystal layer can suppress light leakage in a dark state, and can improve the black display. Furthermore, a plurality of tilt directions of liquid crystal can be obtained, when a voltage is applied, because of the projection 120; therefore, a view angle at the time of light display can be improved. In this way, by using the liquid crystal cell of this embodiment mode, a liquid crystal display device with further higher display quality can be obtained.

Embodiment Mode 3

Figure 3A:
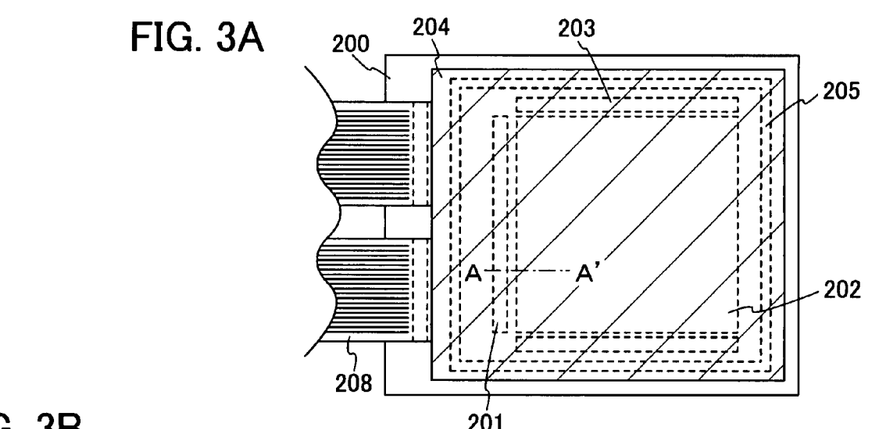
FIGS. 3A and 3B are views of a liquid crystal display device using the present invention.
Figure 3B:
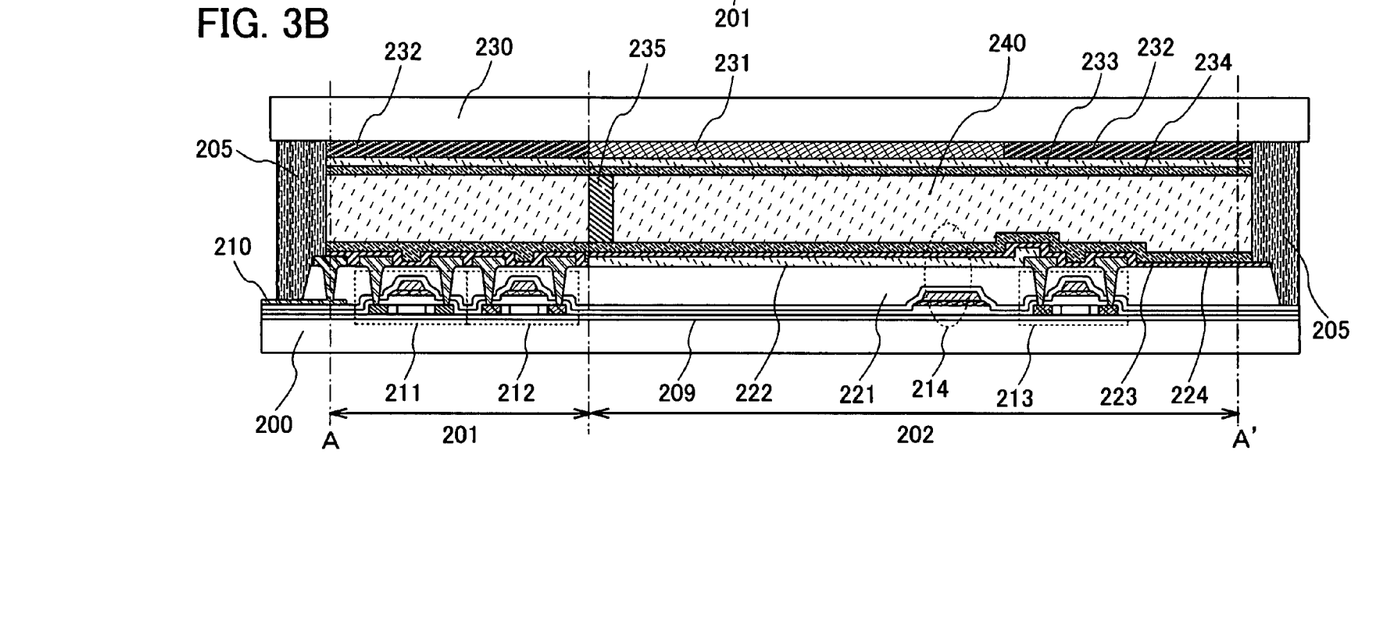

In this embodiment mode, an active type liquid crystal display device to which the present invention is applied will be described with reference to FIGS. 3A and 3B. FIG. 3A is a top view showing a light emitting device, and FIG. 3B is a cross-sectional view along a line A-A' in FIG. 3A (a view of a cutting surface of A-A'). In FIGS. 3A and 3B, corresponding parts are indicated by the same reference numerals. Reference numeral 200 denotes a substrate; 201 shown by a dotted line denotes a driver circuit portion (a source side driver circuit); 202, a pixel portion; 203, a driver circuit portion (a gate side driver circuit); 204, an opposite substrate; and 205, a sealant.

Next, the cross-sectional structure will be descried with reference to FIG. 3B. Driver circuit portions and a pixel portion are formed over the substrate 200, and here, the source side driver circuit 201 as a driver circuit portion and the pixel portion 202 are shown. A base film 209 is provided over the substrate 200.

As the substrate 200, a glass substrate such as barium borosilicate glass or alumino borosilicate glass, a quartz substrate, a stainless steel substrate, or the like can be used. In addition, a substrate formed of a flexible synthetic resin such as plastic typified by polyethylene terephthalate (PET), polyethylene naphthalate (PEN), and polyether sulfone (PES), and acrylic can also be used as long as it can resist a treatment temperature in a manufacturing process, although these substrates generally tend to have a lower heatproof temperature than the other substrates.

In the source side driver circuit 201, a CMOS circuit is formed by a combination of an n-channel thin film transistor 211 and a p-channel thin film transistor 212. The driver circuit formed of the thin film transistor may be formed by a known CMOS circuit, a PMOS circuit, or a NMOS circuit. Although this embodiment mode shows a driver integrated type in which a driver circuit is formed over a substrate, which is not always necessary, and the driver circuit can be formed not over the substrate but outside the substrate.

In the pixel portion 202, a switching thin film transistor 213 and a capacitor 214 are formed. The switching thin film transistor 213 is covered with an interlayer insulating film 221, and a source or drain electrode of the switching thin film transistor 213 is electrically connected to a pixel electrode 222 through a contact hole.

Next, a protective film 223 is formed so as to cover a wiring of the switching thin film transistor 213, the pixel electrode 222, wirings of the n-channel thin film transistor 211 and the p-channel thin film transistor 212. By the protective film 223, an impurity can be prevented from entering an active layer of the thin film transistor, the interlayer insulating film 221, and the like.

An orientation film 224 is formed over the protective film 223. It is to be noted that rubbing treatment is performed on the orientation film 224.

Next, an opposite substrate 230 is prepared. The opposite substrate 230 is provided with a color filter 231 and a black matrix (BM) 232. When the color filter 231 and the black matrix (BM) 232 are formed by a droplet discharging method (an ink jet method, typically), waste of a material can be avoided, although the method is not limited thereto. It is to be noted that the color filter 231 is provided in a region where the switching thin film transistor 213 is not placed. The color filter 231 or the like may be formed by materials presenting red (R), green (G), and blue (B) in a case where the liquid crystal display device is a full-color display, and formed by a material presenting at least one color in a case of a monocolor display. In addition, the color filter 231 may have a structure in which color conversion layers are stacked. The black matrix 232 is provided so as to reduce outside light reflection due to wirings of the switching thin film transistor 213, other transistors, or the like. Therefore, the black matrix 232 may be provided over the switching thin film transistor 213, the n-channel thin film transistor 211, and the p-channel thin film transistor 212.

Subsequently, an opposite electrode 233 and an orientation film 234 are provided. It is to be noted that rubbing treatment is performed on the orientation film 234. The rubbing direction is anti-parallel rubbing.

Such opposite substrate 230 is attached to the substrate 200 by using a sealant 205. The sealant 205 can be selectively applied on the substrate 200 using a dispenser method or the like. In order to keep a space between the substrate 200 and the opposite substrate 230, a spacer 235 are provided in the pixel portion 202 and the driver circuit portion. The spacer 235 has a pillar shape, a spherical shape, or the like.

Next, a liquid crystal material containing an ultraviolet curable liquid crystalline monomer is injected between the substrate 200 and the opposite substrate 230 which are attached together; thereby forming a liquid crystal layer 240. When liquid crystal is injected, the injection is preferably performed in a vacuum. The liquid crystal layer may be formed by other methods than the method in which the liquid crystal material is injected. For example, the liquid crystal material may be dropped and then the opposite substrate 230 may be attached. Such a dropping method is preferable when dealing with a large substrate. It is to be noted that the ultraviolet curable liquid crystalline monomer is contained at a concentration of more than 0 wt % and not more than 1.0 wt % in a liquid crystal material from the view point of suppressing light leakage in a dark state and a voltage holding rate. More preferably, the ultraviolet curable liquid crystalline monomer is contained at a concentration of 0.1 to 1.0 wt % in the liquid crystal material.

After the liquid crystal material is injected, the liquid crystal layer 240 is irradiated with ultraviolet rays, so that the ultraviolet curable liquid crystalline monomer contained in the liquid crystal material reacts. It is to be noted that the irradiation conditions such as wavelength, intensity, and irradiation time are selected arbitrarily within a degree which does not deteriorate the liquid crystal material, and does not affect the switching thin film transistor 213, the n-channel thin film transistor 211, and the p-channel thin film transistor 212. In a case of an active matrix display device, the irradiation time needs to be longer than that for the liquid crystal cell in Embodiment Modes 1 and 2, since emitted ultraviolet is interrupted by the wirings and black matrix.

After that, the first substrate 101 and the second substrate 102 are provided with a pair of polarizing plates of which polarizing axes cross at right angles, respectively.

Reference numeral 210 denotes a wiring for transmitting a signal inputted to the source side driver circuit 201 or the gate side driver circuit 203, which receives a video signal, a clock signal, a start signal, a reset signal, or the like from an FPC (flexible printed circuit) 208 as an external input terminal. It is to be noted that, although only the FPC is shown in the view, a print-wiring board (PWB) may be attached to the FPC. The display device of the present invention includes not only a case of a display device body by itself but also a case where an FPC or a PWB is attached to the display device body.

As described above, a liquid crystal display device of this embodiment mode can suppress light leakage in a dark state, and can improve the black display by irradiating a liquid crystal layer containing an ultraviolet curable liquid crystalline monomer with ultraviolet rays. Therefore, a liquid crystal display device with an excellent contrast and high display quality can be obtained.

Although the description is made on an active type display device in which a voltage to be applied to liquid crystal is controlled by the switching thin film transistor 213 in this embodiment mode, a display device of the present invention may be a passive type display device in which a thin film transistor is not provided in each pixel.

This embodiment mode can be used by freely combining with other embodiment modes and embodiments.

Embodiment Mode 4

Electronic apparatuses provided with a liquid crystal display device of the present invention include a television set (also referred to simply as a television or a television receiver), cameras such as a digital camera and a digital video camera, a mobile phone set (also referred to simply as a mobile phone or a cell-phone), a portable information terminal such as a PDA (personal digital assistant), a portable game machine, a monitor for a computer, a computer, an audio reproducing device such as a car audio system, an image reproducing device provided with a recording medium such as a home game machine, and the like. The specific examples will be described with reference to FIGS. 4A to 4F.

Figure 4A:
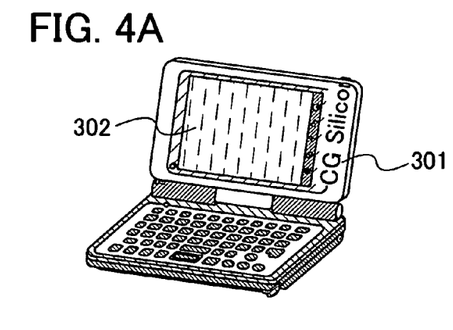
FIGS. 4A to 4F are views of electronic apparatuses using the invention.

A portable information terminal apparatus shown in FIG. 4A includes a main body 301, a display portion 302, and the like. By applying the liquid crystal display device of the present invention to the display portion 302, light leakage in a dark state can be suppressed. Therefore, a portable information terminal apparatus having a display portion with an excellent contrast and high display quality can be obtained.

Figure 4B:
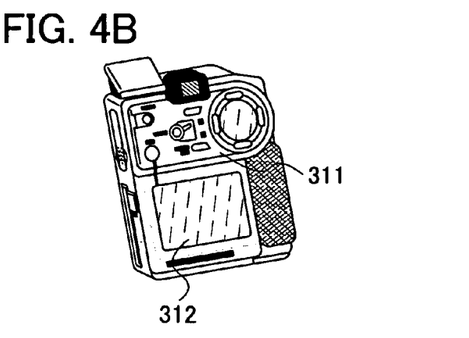

A digital video camera shown in FIG. 4B includes a main body 311, a display portion 312, and the like. By applying the liquid crystal display device of the present invention to the display portion 312, light leakage in a dark state can be suppressed. Therefore, a digital video camera having a display portion with an excellent contrast and high display quality can be obtained.

Figure 4C:
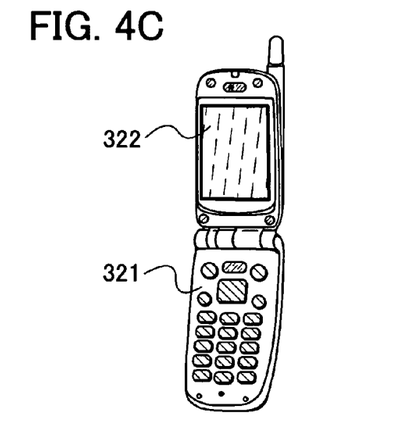

A mobile phone shown in FIG. 4C includes a main body 321, a display portion 322, and the like. By applying the liquid crystal display device of the present invention to the display portion 322, light leakage in a dark state can be suppressed. Therefore, a mobile phone having a display portion with an excellent contrast and high display quality can be obtained.

Figure 4D:
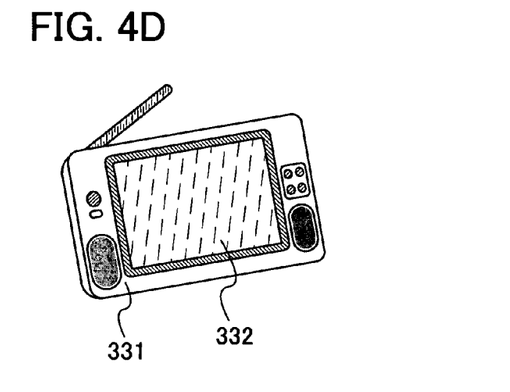

A portable television device shown in FIG. 4D includes a main body 331, a display portion 332, and the like. By applying the liquid crystal display device of the present invention to the display portion 332, light leakage in a dark state can be suppressed. Therefore, a portable television device with an excellent contrast and high display quality can be obtained. In addition, the liquid crystal display device of the present invention can be applied to a broad range of television devices from a small-size one mounted onto a portable terminal such as a mobile phone to a medium-size one which can be taken along, in addition, a large-size one (for example, 40 inches or more).

Figure 4E:
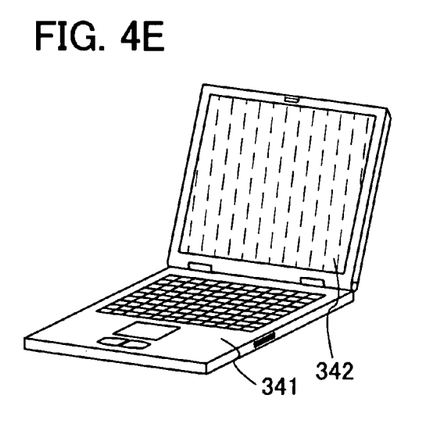

A portable computer shown in FIG. 4E includes a main body 341, a display portion 342, and the like. By applying the liquid crystal display device of the present invention to the display portion 342, light leakage in a dark state can be suppressed. Therefore, a portable computer with an excellent contrast and high display quality can be obtained.

Figure 4F:
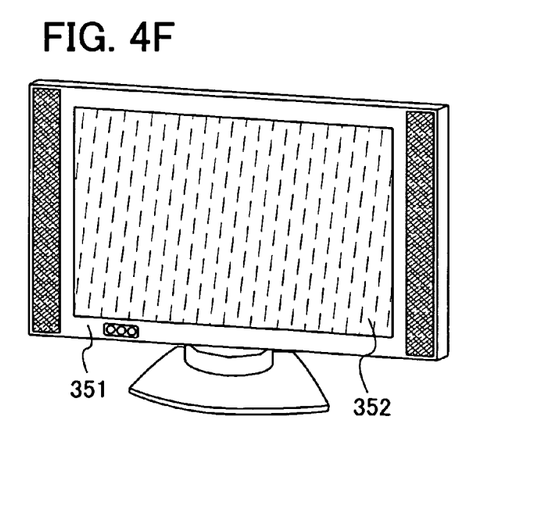

A television device shown in FIG. 4F includes a main body 351, a display portion 352, and the like. By applying the liquid crystal display device of the present invention to the display portion 352, light leakage in a dark state can be suppressed. Therefore, a television device with an excellent contrast and high display quality can be obtained.

In this manner, by using the liquid crystal display device of the present invention, light leakage in a dark state can be suppressed and the black display can be improved. Therefore, an electronic apparatus with an excellent contrast and high display quality can be provided.

Embodiment 1

Figure 5:
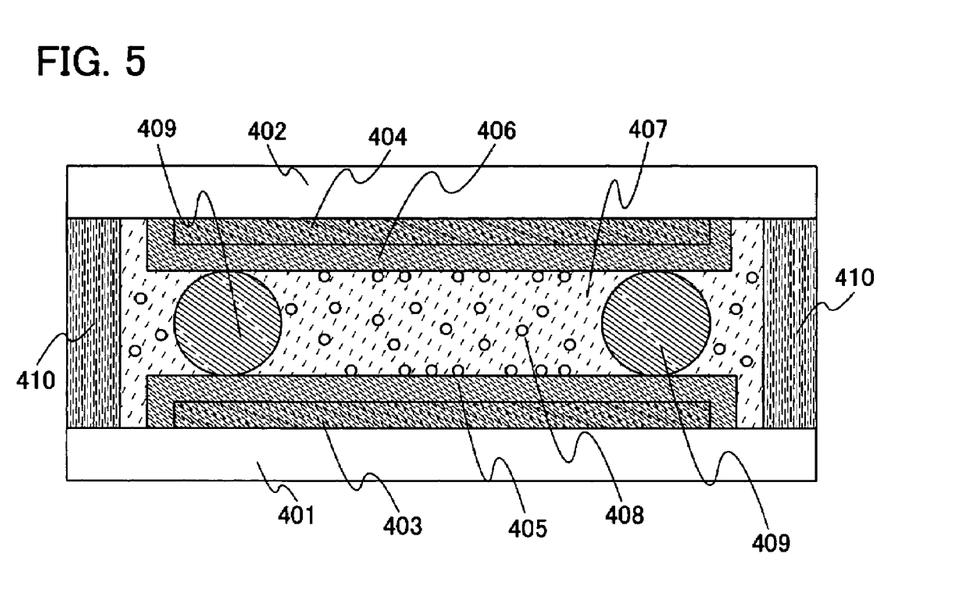
FIG. 5 is a cross-sectional view of a liquid crystal cell manufactured in Embodiment 1.

In order to evaluate optical characteristics of a liquid crystal material containing an ultraviolet curable liquid crystalline monomer, a liquid crystal cell shown in FIG. 5 was manufactured.

A glass substrate of 2 cm by 2 cm and 0.7 mm thick was used for each of a first substrate 401 and a second substrate 402, and a first electrode 403 and a second electrode 404 formed of ITO films which are transparent electrodes were formed over the first substrate 401 and the second substrate 402, respectively. It is to be noted that the first electrode 403 and the second electrode 404 are used as extraction electrodes for applying an electric field to liquid crystal from outside. Each of the first electrode 403 and the second electrode 404 is 7 mm by 7 mm.

Orientation films 405 and 406 for vertical alignment which orient a liquid crystal material were formed to a thickness of 60 nm over the first electrode 403 and the second electrode 404 formed over the first substrate 401 and the second substrate 402, respectively. As the orientation films for vertical alignment, SE-5300 (manufactured by Nissan Chemical Industries, Ltd.) was used.

Next, rubbing treatment was performed on the orientation films 405 and 406. The rubbing conditions were as follows: stage feed speed 10 mm/s; roll revolution speed 300 rpm; and roll pushing depth 0.3 mm, and anti-parallel rubbing was performed.

Next, spacers 409 are placed over the first substrate 401 provided with the orientation film. As the spacers 409, spherical beads spacers were used. Then, in order to bond the first substrate 401 and the second substrate 402 together so that the portions where electrodes are formed face each other, a sealant 410 was applied over the first substrate 401, and the two substrates were attached together. As the sealant, an epoxy resin in which cylindrical fibers mainly containing $SiO_2$ are mixed was used.

Next, a liquid crystal layer 407 is formed. The formation method will be described hereinafter. First, a liquid crystal material was interposed between the first substrate 401 and the second substrate 402 by using a vacuum injection method. As the liquid crystal material, MLC2038 (manufactured by Merck Ltd.) which is nematic liquid crystal of which dielectric anisotropy is negative and UCL003 (manufactured by Dainippon Ink and Chemicals, Incorporated) which corresponds to a liquid crystalline monomer 408 were used. After the electrodes were extracted, sealing was performed with a resin. Furthermore, in order to get rid of orientation nonuniformity of liquid crystal which was generated when the liquid crystal was injected, the liquid crystal layer was held for 30 seconds in a heating apparatus in which the temperature was controlled to be 5 to 10° C. higher than a phase transition temperature of liquid crystal, then the temperature was lowered to the room temperature.

Next, the liquid crystal cell was irradiated with ultraviolet rays. Ultraviolet of which a center wavelength is 365 nm and irradiation intensity is 6.0 mW/cm$^2$ was used, and irradiation time was one minute. In the above-described way, the liquid crystal layer 407 was formed. Subsequently, the first substrate 401 and the second substrate 402 were provided with a pair of polarizing plates of which polarizing axes cross at right angles.

Figure 6:
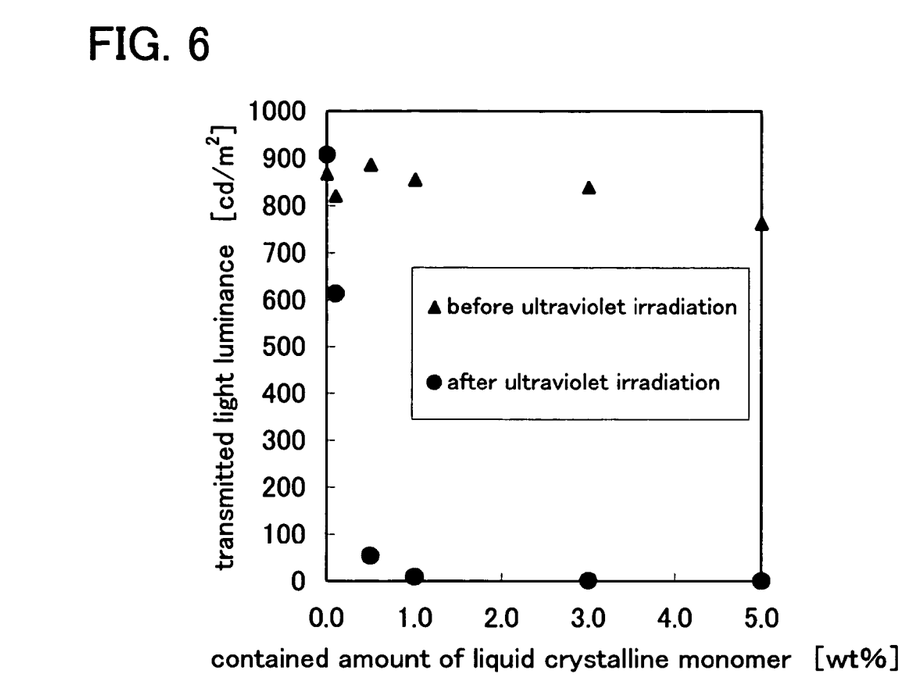
FIG. 6 is a diagram showing a result of measuring luminance of transmitted light of a liquid crystal cell manufactured in Embodiment 1.

As for the liquid crystal cell manufactured as described above, transmitted light luminance with respect to a contained amount of a liquid crystalline monomer before and after the ultraviolet irradiation was measured. The result is shown in FIG. 6. It is to be noted that the measurement was conducted with the contained amount of the liquid crystalline monomer within a range of 0 to 5 wt % in the liquid crystal material. In addition, the transmitted light luminance corresponds to light leakage. From FIG. 6, it could be seen that transmitted light luminance reduces by irradiating the liquid crystal layer with ultraviolet rays. Therefore, it was found that ultraviolet irradiation can suppress light leakage. Furthermore, in a case where the liquid crystal layer is irradiated with ultraviolet rays, a suppressive effect of light leakage improves as the contained amount of the liquid crystalline monomer increases, and when the contained amount was 1 wt % or more, the transmitted light luminance could be approximately 0 cd/m$^2$. It is to be noted that even when only a small amount of the liquid crystalline monomer was contained, a suppressive effect of light leakage was observed, compared to a case where the liquid crystalline monomer was 0 wt %. Accordingly, it was found that a suppressive effect of light leakage can be obtained when a contained amount of a liquid crystalline monomer is more than 0 wt % in a liquid crystal material and a liquid crystal layer is irradiated with ultraviolet rays.

Figure 7:
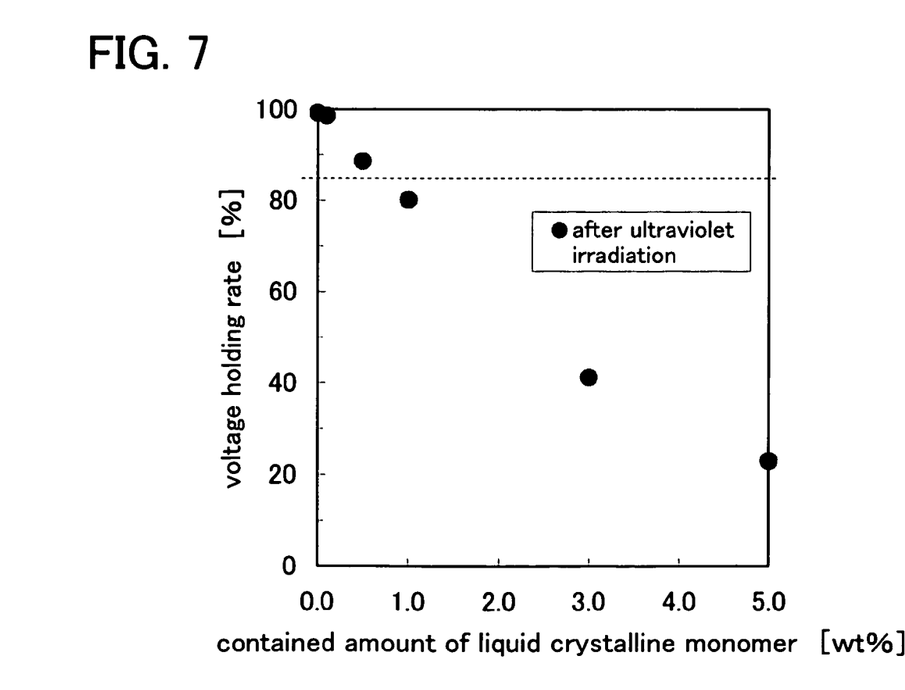
FIG. 7 is a diagram showing a result of measuring a voltage holding rate of a liquid crystal cell manufactured in Embodiment 1.

In addition, in a case of using the liquid crystal cell for a liquid crystal display device, a voltage holding rate also needs to be considered. When a voltage holding rate is low, it causes flickering of display, tone change, and the like. Then, a voltage holding rate of the liquid crystal cell with respect to a contained amount of a liquid crystalline monomer after the ultraviolet irradiation was measured. The result is shown in FIG. 7. It is to be noted that the measurement was conducted with the contained amount of the liquid crystalline monomer within a range of 0 to 5 wt % in the liquid crystal material. The applied voltage was 5V, and a voltage holding rate 100% corresponds to a condition where voltage reduction does not occur at all with respect to the applied voltage.

From FIG. 7, it was found that a voltage holding rate of a liquid crystal cell after the ultraviolet irradiation decreases as a contained amount of a liquid crystalline monomer increases. In a case of applying a liquid crystal layer containing a liquid crystalline monomer to a display device, if it is desirable that a voltage holding rate of 80% is ensured as a rough indication, it was found that a contained amount of the liquid crystalline monomer is 1.0 wt % or less in a liquid crystal material.

As described above, it was found that, from the viewpoint of suppression of light leakage and a voltage holding rate, a contained amount of a liquid crystalline monomer is preferably more than 0 wt % and not more than 1.0 wt % in a liquid crystal material. More preferably, 0.1 to 1.0 wt %.

By applying a liquid crystal layer containing a liquid crystalline monomer irradiated with ultraviolet rays with the above-described range to a display device, light leakage in a dark state can be suppressed, and the black display can be improved. Therefore, a liquid crystal display device with an excellent contrast and high display quality can be obtained.

This application is based on Japanese Patent Application serial no. 2005-268450 filed in Japan Patent Office on Sep. 15, 2005, the entire contents of which are hereby incorporated by reference.

The invention claimed is:

1. A method for manufacturing a liquid crystal display device, comprising the steps of:
   forming an electrode over one surface of each of a pair of substrates;
   forming orientation films over the electrodes respectively;
   performing orientation treatment on at least one of the orientation films; and
   sandwiching a liquid crystal layer by the pair of substrates so that the orientation films face each other,
   wherein the liquid crystal layer includes a liquid crystal molecule, and an ultraviolet curable liquid crystalline monomer at a concentration of more than 0 wt % and not more than 1.0 wt %;
   wherein the liquid crystal layer is irradiated with ultraviolet rays so that the ultraviolet curable liquid crystalline monomer reacts; and
   wherein the liquid crystal molecule is oriented vertical to the substrate.

2. A method for manufacturing a liquid crystal display device, comprising the steps of:
   forming an electrode over one surface of each of a pair of substrates;
   forming orientation films over the electrodes respectively;
   performing orientation treatment on at least one of the orientation films; and
   sandwiching a liquid crystal layer by the pair of substrates so that the orientation films face each other,
   wherein the liquid crystal layer includes a liquid crystal molecule, and an ultraviolet curable liquid crystalline monomer at a concentration of more than 0.5 wt % and not more than 1.0 wt %;
   wherein the liquid crystal layer is irradiated with ultraviolet rays so that the ultraviolet curable liquid crystalline monomer reacts; and
   wherein the liquid crystal molecule is oriented vertical to the substrate.

3. A method for manufacturing a liquid crystal display device, comprising the steps of:
   forming an electrode over one surface of each of a pair of substrates;
   forming orientation films over the electrodes respectively;
   performing orientation treatment on at least one of the orientation films; and
   sandwiching a liquid crystal layer by the pair of substrates so that the orientation films face each other,
   wherein the liquid crystal layer includes a liquid crystal molecule, and an ultraviolet curable liquid crystalline monomer at a concentration of 0.1 to 1.0 wt %;
   wherein the liquid crystal layer is irradiated with ultraviolet rays so that the ultraviolet curable liquid crystalline monomer reacts; and
   wherein the liquid crystalmolecule is oriented vertical to the substrate.

4. A method for manufacturing a liquid crystal display device according to any one of claims 1 to 3,
   wherein a rubbing method is used as the orientation treatment.

5. A method for manufacturing a liquid crystal display device according to any one of claims 1 to 3, wherein a pair of polarizing plates of which polarizing axes cross at right angles are placed over the pair of substrates.

6. A method for manufacturing a liquid crystal display device according to any one of claims 1 to 3, wherein the ultraviolet curable liquid crystalline monomer is an acryloyloxy group attached with a liquid crystal skeleton.

7. A manufacturing method of a liquid crystal display device, comprising the steps of:
   forming an electrode over one surface of each of a pair of substrates;
   forming orientation films over the electrodes respectively;
   performing orientation treatment on at least one of the orientation films; and
   sandwiching a liquid crystal layer by the pair of substrates so that the orientation films face each other,
   wherein the liquid crystal layer includes a liquid crystal material containing an ultraviolet curable liquid crystalline monomer at a concentration of more than 0 wt % and not more than 1.0 wt %;
   wherein the liquid crystal layer is irradiated with ultraviolet rays so that the ultraviolet curable liquid crystalline monomer reacts;
   wherein the ultraviolet curable liquid crystalline monomer is an acryloylosy group attached with a liquid crystal skeleton; and
   wherein the liquid crystal skeleton is one of a biphenyl-based skeleton, a tolan-based skeleton, an ester-based skeleton, an alkenyl-based skeleton, a cyclohexene-based skeleton, an azine-based skeleton, a fluorine-containing condensed ring-based skeleton, and a naphthalene-based skeleton.

8. A liquid crystal display device comprising:
   a pair of electrodes over a pair of substrates, respectively;
   a pair of orientation films over the pair of the electrodes, respectively; and
   a liquid crystal layer interposed between the pair of the orientation films,
   wherein the liquid crystal layer includes a liquid crystal molecule, and an ultraviolet curable liquid crystalline monomer at a concentration of more than 0 wt % and not more than 1.0 wt %;
   wherein the liquid crystal layer is irradiated with ultraviolet rays so that the ultraviolet curable liquid crystalline monomer reacts; and
   wherein the liquid crystal molecule is oriented vertical to the substrate.

9. A liquid crystal display device comprising:
   a pair of electrodes over a pair of substrates, respectively;
   a pair of orientation films over the pair of the electrodes, respectively; and
   a liquid crystal layer interposed between the pair of the orientation films,
   wherein the liquid crystal layer includes a liquid crystal molecule, and an ultraviolet curable liquid crystalline monomer at a concentration of more than 0.1 wt % and not more than 1.0 wt %;
   wherein the liquid crystal layer is irradiated with ultraviolet rays so that the ultraviolet curable liquid crystalline monomer reacts; and
   wherein the liquid crystal molecule is oriented vertical to the substrate.

10. A liquid crystal display device according to claim 8 or 9,
    wherein rubbing treatment is given to the pair of the orientation films.

11. A liquid crystal display device according to claim 8 or 9, wherein a pair of polarizing plates of which polarizing axes cross at right angles are placed over the pair of substrates.

12. A liquid crystal display device according to claim 8 or 9,
wherein the ultraviolet curable liquid crystalline monomer is an acryloyloxy group attached with a liquid crystal skeleton.

13. A liquid crystal display device comprising:

a pair of electrodes over a pair of substrates, respectively;

a pair of orientation films over the pair of the electrodes, respectively; and a liquid crystal layer interposed between the pair of the orientation films, wherein the liquid crystal layer includes an ultraviolet curable liquid crystalline monomer at a concentration of more than 0 wt % and not more than 1.0 wt %;

wherein the liquid crystal layer is irradiated with ultraviolet rays so that the ultraviolet curable liquid crystalline monomer reacts;

wherein the ultraviolet curable liquid crystalline monomer is an acryloylosy group attached with a liquid crystal skeleton; and wherein the liquid crystal skeleton is one of a biphenyl-based skeleton, a tolan-based skeleton, an ester-based skeleton, an alkenyl-based skeleton, a cyclohexene-based skeleton, an azine-based skeleton, a fluorine-containing condensed ring-based skeleton, and a naphthalene-based skeleton.

14. A liquid crystal display device according to claim 8 or 9, further comprising:

a projection over at least one of the pair of the electrodes.

15. A liquid crystal display device according to claim 14,
wherein the projection is covered with one of the orientation films.

16. A liquid crystal display device according to claim 14,
wherein a material of the projection is selected from the group of silicon oxide, silicon nitride, silicon oxynitride, an acrylic resin, an epoxy resin, a resist, and divinylbenzene.

* * * * *

UNITED STATES PATENT AND TRADEMARK OFFICE
CERTIFICATE OF CORRECTION

PATENT NO. : 7,697,098 B2
APPLICATION NO. : 11/520773
DATED : April 13, 2010
INVENTOR(S) : Daisuke Kubota et al.

It is certified that error appears in the above-identified patent and that said Letters Patent is hereby corrected as shown below:

At column 13, line 60, please change "crystalmolecule" to --crystal molecule--.

Signed and Sealed this

Twenty-fourth Day of August, 2010

David J. Kappos
*Director of the United States Patent and Trademark Office*